US008893262B2

(12) United States Patent
Tjahjono et al.

(10) Patent No.: US 8,893,262 B2
(45) Date of Patent: Nov. 18, 2014

(54) ESTABLISHING AN IPSEC (INTERNET PROTOCOL SECURITY) VPN (VIRTUAL PRIVATE NETWORK) TUNNEL

(71) Applicants: Danu Tjahjono, Dublin, CA (US); Rafiq Shaikh, Santa Clara, CA (US); Wenge Ren, Sunnyvale, CA (US)

(72) Inventors: Danu Tjahjono, Dublin, CA (US); Rafiq Shaikh, Santa Clara, CA (US); Wenge Ren, Sunnyvale, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 87 days.

(21) Appl. No.: 13/868,310

(22) Filed: Apr. 23, 2013

(65) Prior Publication Data

US 2014/0068750 A1    Mar. 6, 2014

Related U.S. Application Data

(60) Provisional application No. 61/694,846, filed on Aug. 30, 2012.

(51) Int. Cl.
```
G06F 9/00      (2006.01)
H04L 29/06     (2006.01)
H04W 12/00     (2009.01)
```
(52) U.S. Cl.
CPC .......... H04L 63/0272 (2013.01); H04L 63/164 (2013.01); H04W 12/00 (2013.01)
USPC .......................................................... 726/15

(58) Field of Classification Search
USPC ........................................................ 726/15
See application file for complete search history.

(56) References Cited

U.S. PATENT DOCUMENTS

| | | | |
|---|---|---|---|
| 6,704,301 B2 | 3/2004 | Chari et al. | |
| 6,965,575 B2 | 11/2005 | Srikrishna et al. | |
| 7,031,293 B1 | 4/2006 | Srikrishna et al. | |
| 7,058,021 B2 | 6/2006 | Srikrishna et al. | |
| 7,131,141 B1* | 10/2006 | Blewett et al. | 726/12 |
| 7,376,087 B2 | 5/2008 | Srikrishna | |
| 7,397,789 B2 | 7/2008 | Chari et al. | |
| 7,447,901 B1* | 11/2008 | Sullenberger et al. | 713/153 |
| 7,505,426 B2 | 3/2009 | Srikrishna et al. | |
| 7,551,562 B2 | 6/2009 | Srikrishna et al. | |
| 7,668,137 B2 | 2/2010 | Srikrishna et al. | |
| 7,688,808 B2 | 3/2010 | Ren et al. | |
| 7,689,224 B2 | 3/2010 | Chari et al. | |
| 7,917,948 B2* | 3/2011 | Kalimuthu et al. | 726/15 |
| 2008/0013474 A1 | 1/2008 | Nagarajan et al. | |
| 2008/0020759 A1 | 1/2008 | Nagarajan et al. | |
| 2008/0183853 A1 | 7/2008 | Manion et al. | |
| 2009/0034470 A1 | 2/2009 | Nagarajan et al. | |
| 2009/0097490 A1 | 4/2009 | Sanderson et al. | |
| 2011/0004913 A1 | 1/2011 | Nagarajan et al. | |
| 2012/0096269 A1* | 4/2012 | McAlister | 713/171 |
| 2012/0188934 A1 | 7/2012 | Liu et al. | |

* cited by examiner

Primary Examiner — Teshome Hailu
(74) Attorney, Agent, or Firm — Brian R. Short

(57) ABSTRACT

Systems, methods and apparatuses of establishing an IPsec (Internet Protocol Security) VPN (Virtual Private Network) tunnel are disclosed. One method includes receiving, by a wireless mesh network access point, a user configuration, wherein the user configuration includes a type of traffic, determining an internal interface of the wireless mesh network access node based on the type of traffic, dynamically determining a local endpoint address for the IPsec VPN tunnel based on the selected internal interface, and establishing the IPsec VPN tunnel through the selected internal interface of the wireless mesh network access node.

21 Claims, 4 Drawing Sheets

ESTABLISHING AN IPSEC (INTERNET PROTOCOL SECURITY) VPN (VIRTUAL PRIVATE NETWORK) TUNNEL

RELATED APPLICATION

This patent application claims priority to U.S. Provisional Patent Application No. 61/694,846, filed on Aug. 30, 2012, which is herein incorporated by reference.

FIELD OF THE DESCRIBED EMBODIMENTS

The described embodiments relate generally to wireless communications. More particularly, the described embodiments relate to systems, methods and apparatuses for establishing an IPsec (Internet Protocol Security) VPN (Virtual Private Network) tunnel.

BACKGROUND

Internet Protocol Security (IPsec) is a protocol suite for securing Internet Protocol (IP) communications by authenticating and encrypting each IP packet of a communication session. IPsec also includes protocols for establishing mutual authentication between agents at the beginning of the session and negotiation of cryptographic keys to be used during the session.

IPsec is an end-to-end security scheme operating in the Internet Layer of the Internet Protocol Suite. It can be used in protecting data flows between a pair of hosts (host-to-host), between a pair of security gateways (network-to-network), or between a security gateway and a host (network-to-host).

Typically, IPsec implementation inside a router requires a user to first identify the IP interface of the router. Further, the user is required to identify the router's IP address on which the traffic is originated. Further, the router is used as a local end-point in the IPsec tunnel setup whenever possible. This is hard from the user's perspective since the user is required to have knowledge and understanding of the inner working of the router and what the network interfaces are available inside the router. This is even harder for the user if the traffic to be protected must to go to a specific VLAN and/or the traffic involve serial data packets or other non-IP packets.

It is desirable to have methods and apparatuses for establishing an IPsec (Internet Protocol Security) VPN (Virtual Private Network) tunnel to a wireless access node of a wireless mesh network.

SUMMARY

An embodiment includes a method of establishing an IPsec (Internet Protocol Security) VPN (Virtual Private Network) tunnel. The method includes receiving, by an access node of a wireless mesh network, a user configuration, wherein the user configuration includes a type of traffic, determining an internal interface of the access node based on the type of traffic from at least one physical interface or at least one logical interface, wherein if the type of traffic includes IP traffic, then one of the at least one physical interface is selected, and if the type of traffic includes non-IP traffic, then one of the at least one logical interface is selected, dynamically determining a local endpoint address for the IPsec VPN tunnel based on whether the selected internal interface is the one of the at least one physical interfaces, the one of the at least one logical interfaces, and whether another IPSec VPN tunnel is already utilizing the selected internal interface, and establishing the IPsec VPN tunnel through the selected internal interface of the wireless mesh network access node using the selected local endpoint address.

Another embodiment includes a wireless mesh network access node. The wireless mesh network access node includes one or more transceivers for communicating with an upstream access node or a first upstream gateway of a wireless mesh network, and a client device. The wireless mesh network access node further includes a controller. The controller is operative to receive a user configuration, wherein the user configuration includes a type of traffic, select an internal interface of the access node based on the type of traffic from at least one physical interface or at least one logical interface, wherein if the type of traffic includes IP traffic, then one of the at least one physical interface is selected, and if the type of traffic includes non-IP traffic, then one of the at least one logical interface is selected, dynamically select a local endpoint address for the IPsec VPN tunnel based on whether the selected internal interface is the one of the at least one physical interfaces, the one of the at least one logical interfaces, and whether another IPSec VPN tunnel is already utilizing the selected internal interface, and establish the IPsec VPN tunnel through the selected internal interface of the wireless mesh network access node using the selected local endpoint address.

Another embodiment includes a system for establishing an IPsec (Internet Protocol Security) VPN (Virtual Private Network) tunnel. The system includes a gateway and a wireless mesh network access point wirelessly connected to the gateway. The wireless mesh network access point is operative to receive a user configuration, wherein the user configuration includes a type of traffic, select an internal interface of the access node based on the type of traffic from at least one physical interface or at least one logical interface, wherein if the type of traffic includes IP traffic, then one of the at least one physical interface is selected, and if the type of traffic includes non-IP traffic, then one of the at least one logical interface is selected, dynamically select a local endpoint address for the IPsec VPN tunnel based on whether the selected internal interface is the one of the at least one physical interfaces, the one of the at least one logical interfaces, and whether another IPSec VPN tunnel is already utilizing the selected internal interface, and establish the IPsec VPN tunnel through the selected internal interface of the wireless mesh network access node using the selected local endpoint address.

Other aspects and advantages of the described embodiments will become apparent from the following detailed description, taken in conjunction with the accompanying drawings, illustrating by way of example the principles of the described embodiments.

DETAILED DESCRIPTION

The embodiments described provide systems, methods and apparatuses for establishing an IPsec (Internet Protocol Security) VPN (Virtual Private Network) tunnel between an access node of a wireless mesh network and a remote device. The described embodiments include identifying what type of data traffic that needs to be protected. The type of data traffic can range from wireless traffic, wired traffic, AMI/C12.22 traffic, Serial/DNP3 traffic, or all the above traffic combined along with the VLAN number associated with the data traffic. Once the data traffic type is identified, the VPN server (remote end of the IPsec tunnel) along with the private networks that the IPsec tunnel will serve is configured.

When a user selects the traffic type (for example, through a user configuration), for at least some of the described embodiments, processing of the wireless access node determines what internal interfaces of the wireless access node to use. For example, for wired traffic coming in to the wireless access node from an Ethernet interface (eth1) (which is IP traffic), the processing may designate an eth1 IP address (which is a physical interface) as the local endpoint of an IPsec VPN tunnel being established. For example, for AMI traffic or serial traffic (which is non-IP traffic), the processing may designate a logical interface (as opposed to a physical interface) as an internal interface. For both selections of a physical interface or a logical interface, another interface may be selected for determining the local end point address for the IPsec VPN tunnel being established.

There are many types of VPNs (Virtual Private Networks) available for use in today's networks. One of these types involves use of the IPSec standard. Within IPSec, there are further options on ways to define the VPN. The actual building or construction of the IPSec VPN is very involved. Like other VPNs, an IPSec tunnel is secure, and is encrypted using cryptographic techniques.

Figure 1:
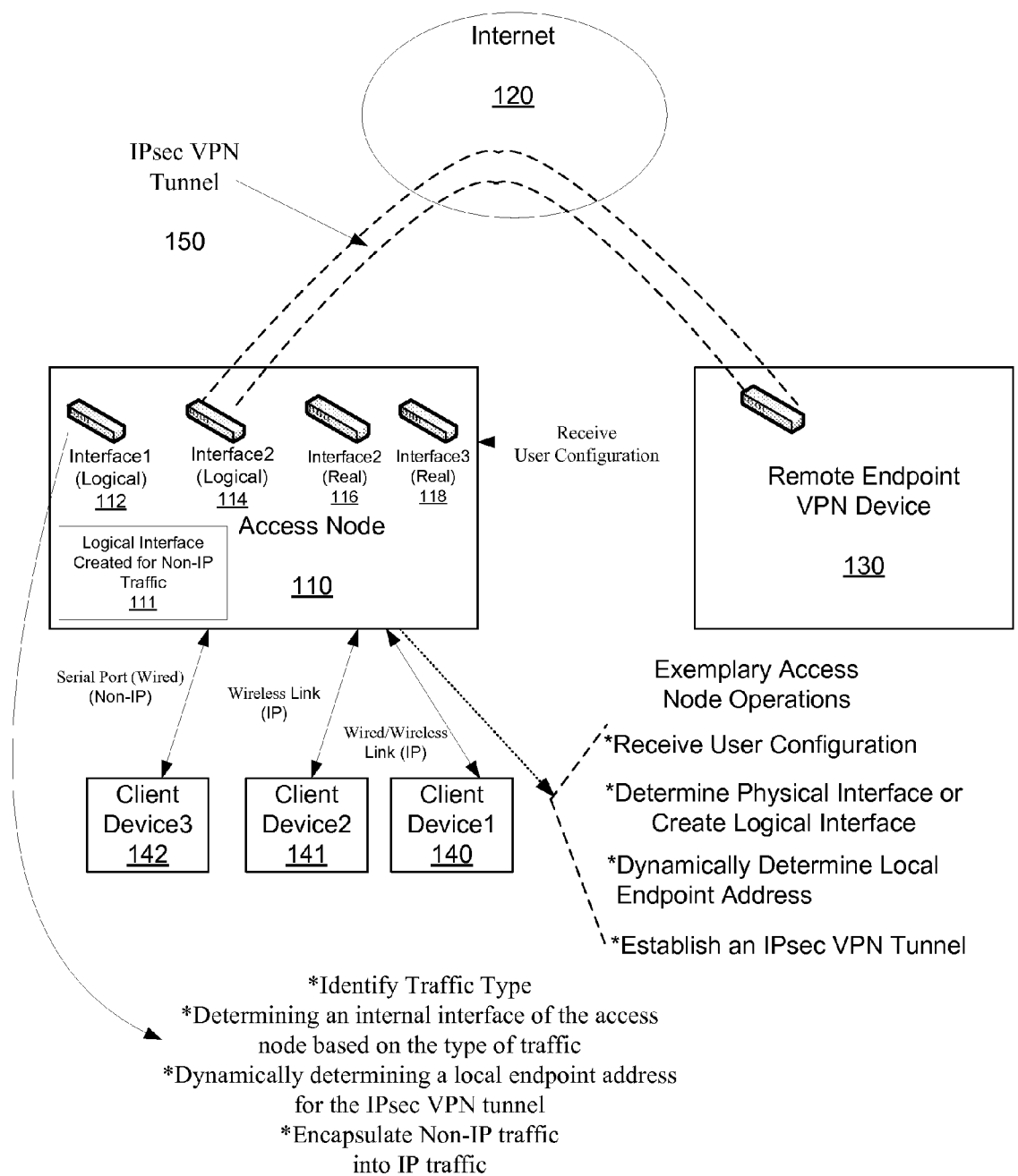
FIG. 1 shows an IPsec VPN tunnel formed between an access node and a remote endpoint VPN device, according to an embodiment.

FIG. 1 shows an IPsec VPN tunnel 150 formed between an access node 110 and a remote endpoint VPN device 130, according to an embodiment. As shown, the access node 110 includes multiple interfaces, including logical interfaces 112, 114, and physical or real interfaces 116, 118. It is to be understood that while only two logical interfaces 112, 114, and two physical 116, 118 are shown, any number of logical interfaces and physical interfaces are possible.

The access node 110 receives a user configuration, which can be selected or determined by a system operator. Generally, the system operator a user that uses, owns or manages the wireless access node and/or the wireless mesh network. For at least some embodiments, the system operator selects which local and remote networks to be secured. Further, for an embodiment, the system operator specifies the remote tunnel endpoint device. Further, for an embodiment, the system operator specifies type of traffic. However, for at least some embodiments, the system operator does not select the local end point address of the IPsec VPN tunnel. As will be described, at least some of the described embodiments include the local end point address of the IPsec VPN tunnel being determined at or by the access node of the wireless mesh network.

The user configuration includes a traffic type. Based on the traffic type, the access node 110 determines an internal interface to be a physical interface or a logical interface. Further, the access node 110 dynamically determines a local endpoint address for an IPsec VPN tunnel 150 based on one of the logical interfaces 112, 114, or one of the physical interfaces 116, 118. Finally, the access node 110 establishes the IPsec VPN tunnel through the selected internal interface of the access node 110 based on the local endpoint address. In this example, the logical interface 114 is selected as the local endpoint address. It is to be understood that the sequence of actions do not have to follow the order described.

As described, an embodiment includes determining the internal interface where the source of traffic is originating whether the source of the traffic includes IP traffic (wired or wireless, with or without VLAN), or non IP traffic. For the IP traffic, the internal interface can be more likely to be the physical interface. For non-IP traffic, at least some embodiments include selecting or creating a new logical interface to bind the non-IP traffic to IP traffic.

Further, as described, at least some embodiments include dynamically determining the local endpoint interface. For at least some embodiments, this includes determining whether local endpoint interface corresponds with the internal interface identified previously determined, or whether another logical interface needs to be created. For at least some embodiments, this is dependent on whether the selected interface is available (for example, another IPsec VPN may already be utilizing the internal interface) and stable (that is, consistently connected). If a new local-end point interface must be created, at least some embodiments include obtaining an IP address from the wireless mesh network (this includes, for example, performing a DHCP (Dynamic Host Configuration Protocol) over the mesh network), and then advertising the IP address and the corresponding routes throughout the wireless mesh network.

As stated, an embodiment includes determining the internal interface of the access node based on the type of traffic. For an embodiment, the internal interface is selected from at least one physical interface or at least one logical interface, wherein if the type of traffic includes IP traffic, then one of the at least one physical interface is selected, and if the type of traffic includes non-IP traffic, then one of the at least one logical interface is selected. A logical interface 111 is depicted in FIG. 1 to illustrate that selection (creation) of the logical interface 111 if the data traffic is non-IP traffic.

For at least some embodiments, the logical interface 111 is used by a program that processes non-IP traffic to IP traffic and vice versa. This program, such as a DNP3 (Distributed Network Protocol) program takes IP traffic, extracts serial data, and then sends it to a DNP3 device. For example, the client device 142 may be a DNP3 device. Thus, the remote device (for example, Serial DNP3 master) that wants to access the serial device (for example, Serial DNP3 client) connected to the access node 110 uses the IP address of the logical-interface-111. However, the traffic goes through the IPsec VPN tunnel by the access node 110. If prior to using IPsec tunnel, the non-IP traffic was bound to a different logical interface or even a physical interface, then the latter interface IP address must be de-advertise throughout the wireless mesh network.

For an embodiment, dynamically determining the local endpoint address for the IPsec VPN tunnel is based on whether the selected internal interface is the one of the at least one physical interfaces, the one of the at least one logical interfaces, and whether another IPSec VPN tunnel is already utilizing the selected internal interface.

As previously stated, an embodiment includes establishing the IPsec VPN tunnel through the selected internal interface of the wireless mesh network access node using the selected local endpoint address.

For an embodiment, the access node includes an internal map that maps the selected internal interface with the type of traffic. That is, when the access node receives the user configuration, the type of traffic within the user configuration is used to select the internal interface by accessing the internal map. For an embodiment, the map includes a look-up-table that provides a selected interface based on the type of traffic. As described, the internal interface can includes a physical interface or a logical interface, which for an embodiment, are selected based on whether the type of traffic includes IP packets or non-IP packets.

For an embodiment, the at least one logical interface is not tied to a physical port, and created to send and receive IP traffic. For an embodiment, the selected logical interface facilitates encapsulating non-IP packets of non-IP traffic within IP packets. For an embodiment, determining at least one logical interface for non-IP traffic includes creating the at least one logical interface with an IP address for encapsulating non-IP packets into IP packets, communicating the IP address to a remote VPN device, and de-advertising a route for the IP address in the wireless mesh network if the IP address is being advertised so that the at least one logical interface cannot be accessed directly without going through the IPsec VPN tunnel. If the user or system operator selects non-IP traffic, a logical interface is created with an IP address to encapsulate the IP packets. Even though this IP address needs to be communicated to the remote VPN device (so that the remote VPN device can build IPsec rules), the route for this IP address in the mesh network needs to be de-advertised so that any remote devices cannot access this IP address directly. Rather, the remote device needs to access the logical interface through the IPsec tunnel for the non-IP traffic.

For at least some embodiments, the selection of the local endpoint address is dependent on whether a physical interface or a logical interface was selected. Further, the selection of the local endpoint address is dependent on whether a prior IPsec VPN tunnel is using the selected physical interface. Further, the selection of the local endpoint address is dependent whether the selected internal interface includes the one of the at least one physical interface on a same VLAN (Virtual Local Area Network) as specified by the user configuration.

Physical Interface

For an embodiment, dynamically determining a local endpoint address for the IPsec VPN tunnel includes determining the local endpoint address to be an address of the selected physical interface if the selected internal interface includes the one of the at least one physical interface physical interface, and a prior IPsec VPN tunnel is not using the selected physical interface.

For an embodiment, dynamically determining a local endpoint address for the IPsec VPN tunnel includes creating a new logical interface, and determining the local endpoint address to be an address of the new logical interface if the selected internal interface includes the one of the at least one physical interface, and a prior IPsec VPN tunnel is using the selected physical interface.

For an embodiment, dynamically determining a local endpoint address for the IPsec VPN tunnel includes determining the local endpoint address to be an address of the selected physical interface if the selected internal interface includes the one of the at least one physical interface on a same VLAN (Virtual Local Area Network) as specified by the user configuration.

For an embodiment, dynamically determining a local endpoint address for the IPsec VPN tunnel includes creating a new logical interface and determining the local endpoint address to be an address of the new logical interface if the selected internal interface includes the one of the at least one physical interface and an available physical interface is not on a same VLAN (Virtual Local Area Network) as specified by the user configuration.

Logical Interface

For an embodiment, dynamically determining a local endpoint address for the IPsec VPN tunnel includes determining the local endpoint address to be an address of an available physical interface if the selected internal interface includes the one of the at least one logical interface that was selected for non-IP traffic.

For an embodiment, dynamically determining a local endpoint address for the IPsec VPN tunnel includes determining the local endpoint address to be an address of an available physical interface if the selected internal interface includes the one of the at least one logical interface that was selected for non-IP traffic, and the selected physical interface is on a same VLAN (Virtual Local Area Network) as specified by the user configuration.

For an embodiment, dynamically determining a local endpoint address for the IPsec VPN tunnel includes creating a new logical interface and determining the local endpoint address to be an address of the new logical interface if the selected internal interface includes the one of the at least one logical interface that was selected for non-IP traffic and no physical interface is available.

For an embodiment, dynamically determining a local endpoint address for the IPsec VPN tunnel includes creating a new logical interface and determining the local endpoint address to be an address of the new logical interface if the selected internal interface includes the one of the at least one logical interface that was selected for non-IP traffic and an available physical interface is not on a same VLAN (Virtual Local Area Network) as specified by the user configuration.

An embodiment further includes communicating the selected internal interface to a remote device if the selected internal interface includes a logical interface, and statically configuring an IP (internet protocol) using the logical interface. For an embodiment, the IP address can be obtained statically using the user configuration or DHCP.

For an embodiment, dynamically determining a local endpoint address for the IPsec VPN tunnel includes advertising to the wireless mesh network, the selected local endpoint address if the selected local endpoint address was selected based on creation of a new logical interface, thereby allowing establishment of the IPsec VPN tunnel.

Figure 2:
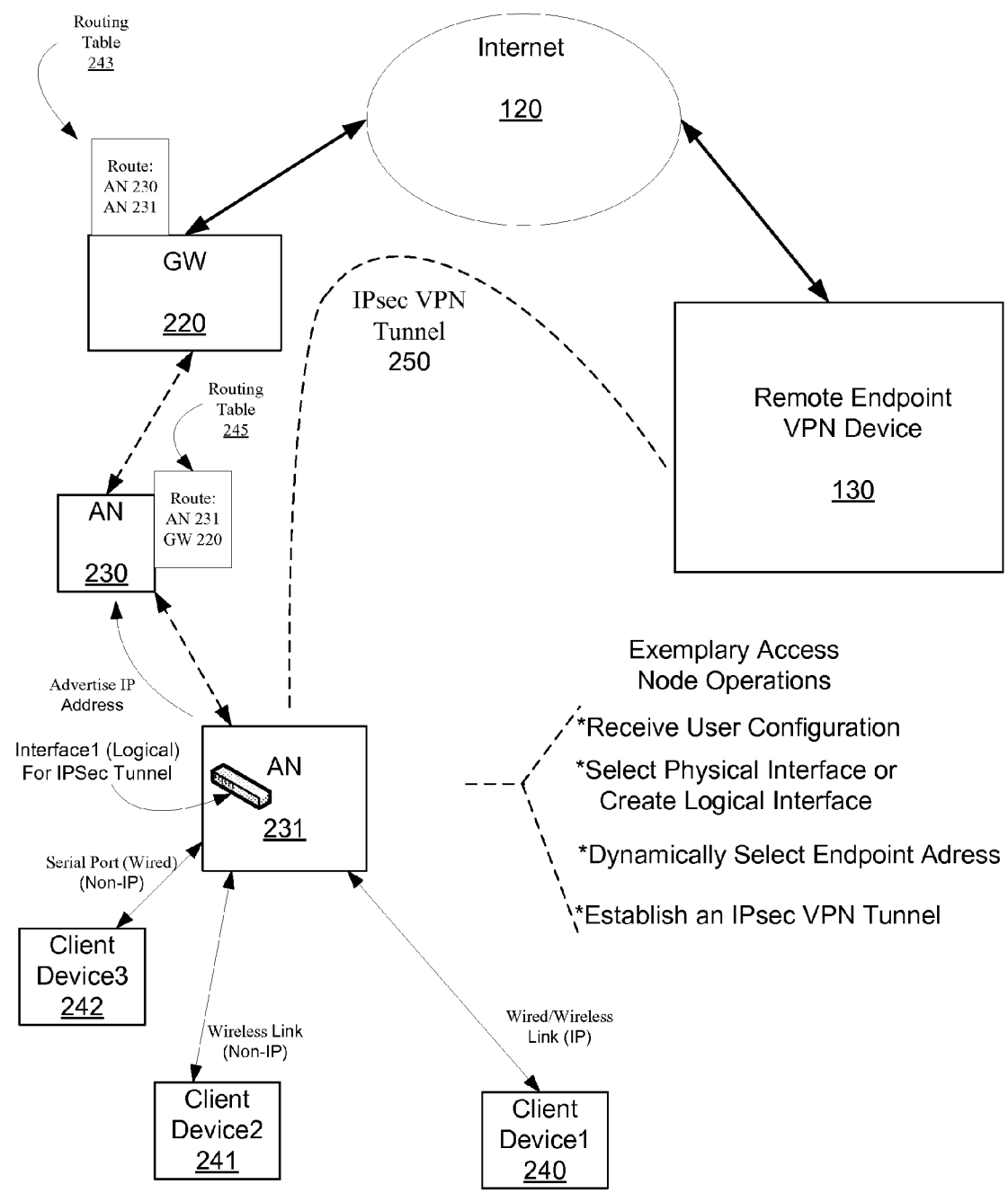
FIG. 2 shows an IPsec VPN tunnel formed between a wireless mesh network access node of a wireless mesh network and a remote endpoint VPN device, according to an embodiment.

FIG. 2 shows an IPsec VPN tunnel formed between a wireless mesh network access node 231 of a wireless mesh network and a remote endpoint VPN device 130, according to an embodiment. Here, the access node 231 has an upstream wireless link to an upstream access node 230, which has an upstream wireless link to a gateway 220. It is to be understood that the describe embodiments for establishing an IPsec (Internet Protocol Security) VPN (Virtual Private Network) tunnel are applicable to any of the access nodes of the wireless mesh network. The IPsec (Internet Protocol Security) VPN (Virtual Private Network) tunnel is formed between the access node 231 and the remote endpoint VPN device 130. For an embodiment, the IPsec (Internet Protocol Security) VPN (Virtual Private Network) tunnel is formed through the internet 120 and at least a portion of the wireless mesh network.

While only one upstream access node 230 is shown, it is to be understood that any number of upstream access nodes can be included between the access node 231 and the gateway 220. For at least some embodiments, the upstream access nodes and the gateway 220 maintain routing tables 243, 245 that allow the upstream access nodes and the gateway 220 to properly route packets received to the access node 231. The upstream access nodes and gateway 220 also maintain the routing tables associated with the client 240,241 and/or 242 if received IP packets are not going through the IPsec tunnel, otherwise the routing tables associated with the selected endpoint addresses inside node 231 are maintained within the routing tables. Additionally, the access node 231 maintains a routing table to allow the access node 231 to properly route received packets to other downstream devices if any. Further, the routing tables allow the access nodes to properly route upstream data packets as well. That is, each access nodes must also maintain the routing table of their immediate upstream node (also referred to as a 'default route'). For example, for AN230, maintains the default route to GW220.

An embodiment includes the access node 231 advertising an IP address of a new logical interface to any upstream access nodes and the upstream gateway of the wireless mesh network if the local endpoint address was determined based on the new logical interface, thereby allowing the any upstream access nodes and the upstream gateway to establish a route to the access node based on the IP address.

If, for example, if the gateway 220 receives one or more IP packets with a destination address having the endpoint IP address, the gateway 220 knows how to route the packet through the wireless mesh network based on a routing table of the gateway 220 that has been updated, for example, with local endpoint address. The gateway 220 then routes the IP packet to the access node or an access node that is downstream to the gateway 220 but upstream to the access node 231. Again, this is facilitated by updated routing tables of the gateway and updated routing tables of the upstream access nodes.

For an embodiment, the gateway 220 advertises the endpoint address to other gateways of the wireless mesh network in case the access node 231 later selects a route through a different upstream gateway of the wireless mesh network.

For an embodiment, the gateway 220 communicates endpoint address to upstream network (outside the mesh) so that upstream network know how to route packets having a destination address of the endpoint address.

Figure 3:
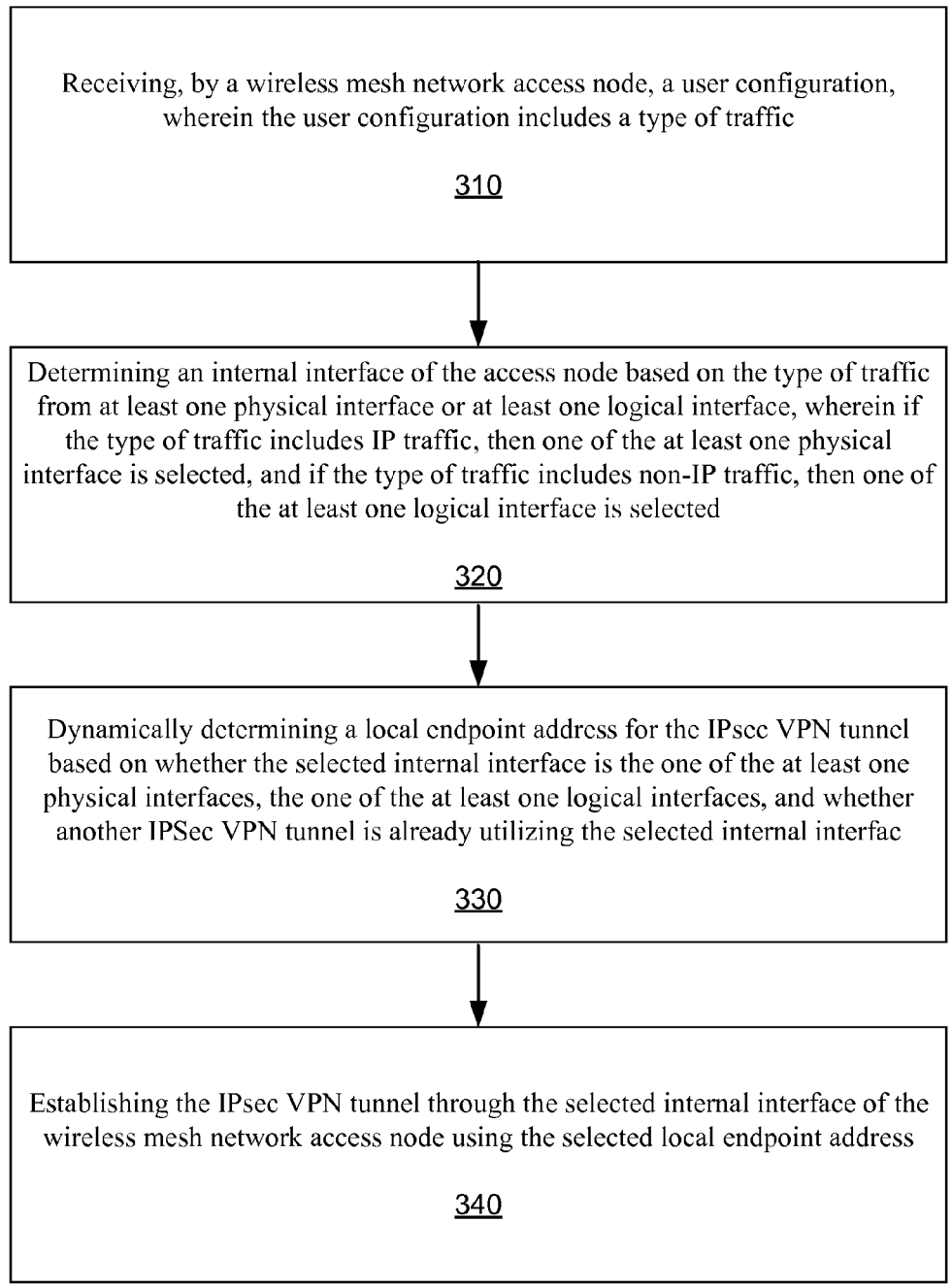
FIG. 3 shows a flow chart that includes steps of a method of establishing an IPsec (Internet Protocol Security) VPN (Virtual Private Network) tunnel.

FIG. 3 shows a flow chart that includes steps of a method of establishing an IPsec (Internet Protocol Security) VPN (Virtual Private Network) tunnel. A first step 310 includes receiving, by a wireless mesh network access point, a user configuration, wherein the user configuration includes a type of traffic. A second step 320 includes determining an internal interface of the access node based on the type of traffic from at least one physical interface or at least one logical interface, wherein if the type of traffic includes IP traffic, then one of the at least one physical interface is selected, and if the type of traffic includes non-IP traffic, then one of the at least one logical interface is selected. A third step 330 includes dynamically determining a local endpoint address for the IPsec VPN tunnel based on whether the selected internal interface is the one of the at least one physical interfaces, the one of the at least one logical interfaces, and whether another IPSec VPN tunnel is already utilizing the selected internal interface. A fourth step 340 includes establishing the IPsec VPN tunnel through the selected internal interface of the wireless mesh network access node using the selected local endpoint address.

For an embodiment, the access node further comprises an internal map that maps the selected internal interface with the type of traffic.

For an embodiment, the at least one logical interface is not tied to a physical port, and created to send and receive IP traffic. An embodiment further includes encapsulating non-IP packets of non-IP traffic within IP packets. For an embodiment, determining at least one logical interface for non-IP traffic includes creating the at least one logical interface with an IP address for encapsulating non-IP packets into IP packets and communicating the IP address to a remote VPN device. An embodiment further includes de-advertising a route for the IP address in the wireless mesh network if the IP address was previously advertised, thereby preventing the IP address from being accessed directly without going through the IPsec VPN tunnel.

For an embodiment, dynamically determining a local endpoint address for the IPsec VPN tunnel includes determining the local endpoint address to be an address of the selected physical interface if the selected internal interface includes the one of the at least one physical interface physical interface, and a prior IPsec VPN tunnel is not using the selected physical interface.

For an embodiment, dynamically determining a local endpoint address for the IPsec VPN tunnel includes creating a new logical interface, and determining the local endpoint address to be an address of the new logical interface if the selected internal interface includes the one of the at least one physical interface, and a prior IPsec VPN tunnel is using the selected physical interface.

For an embodiment, dynamically determining a local endpoint address for the IPsec VPN tunnel includes determining the local endpoint address to be an address of the selected physical interface if the selected internal interface includes the one of the at least one physical interface on a same VLAN (Virtual Local Area Network) as specified by the user configuration.

For an embodiment, dynamically determining a local endpoint address for the IPsec VPN tunnel includes creating a new logical interface and determining the local endpoint address to be an address of the new logical interface if the selected internal interface includes the one of the at least one physical interface and an available physical interface is not on a same VLAN (Virtual Local Area Network) as specified by the user configuration.

For an embodiment, dynamically determining a local endpoint address for the IPsec VPN tunnel includes determining the local endpoint address to be an address of an available physical interface if the selected internal interface includes the one of the at least one logical interface that was selected for non-IP traffic.

For an embodiment, dynamically determining a local endpoint address for the IPsec VPN tunnel includes determining the local endpoint address to be an address of an available physical interface if the selected internal interface includes the one of the at least one logical interface that was selected for non-IP traffic., and the selected physical interface is on a same VLAN (Virtual Local Area Network) as specified by the user configuration.

For an embodiment, dynamically determining a local endpoint address for the IPsec VPN tunnel includes creating a new logical interface and determining the local endpoint address to be an address of the new logical interface if the selected internal interface includes the one of the at least one logical interface that was selected for non-IP traffic and no physical interface is available.

For an embodiment, dynamically determining a local endpoint address for the IPsec VPN tunnel includes creating a new logical interface and determining the local endpoint address to be an address of the new logical interface if the selected internal interface includes the one of the at least one logical interface that was selected for non-IP traffic and an available physical interface is not on a same VLAN (Virtual Local Area Network) as specified by the user configuration.

An embodiment further includes communicating the selected internal interface to a remote device if the selected internal interface includes a logical interface, and statically configuring an IP (internet protocol) using the logical interface.

An embodiment further includes advertising to the wireless mesh network, the selected local endpoint address if the selected local endpoint address was selected based on creation of a new logical interface, thereby allowing establishment of the IPsec VPN tunnel.

Figure 4:
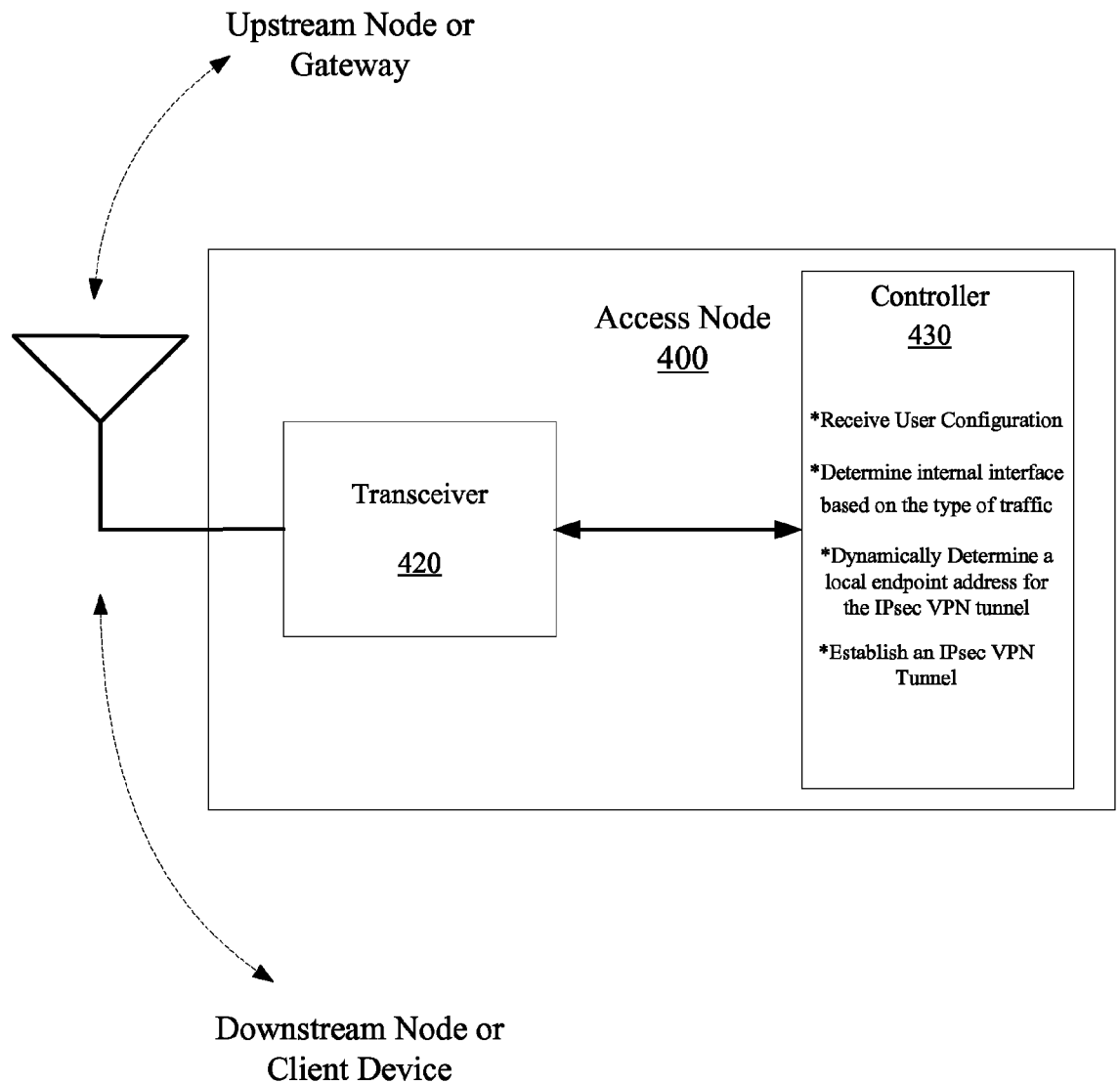
FIG. 4 show an access node, according to an embodiment.

FIG. 4 show a wireless mesh network access node 400, according to an embodiment. The wireless mesh network access node 400 includes one or more transceivers 420 for communicating with an upstream access node or a first upstream gateway of a wireless mesh network, and a client device. The transceivers can be wired or wireless. The wireless mesh network access node 400 further includes a controller 400. For an embodiment, the controller is operative to receive a user configuration, wherein the user configuration includes a type of traffic, select an internal interface of the access node based on the type of traffic from at least one physical interface or at least one logical interface, wherein if the type of traffic includes IP traffic, then one of the at least one physical interface is selected, and if the type of traffic includes non-IP traffic, then one of the at least one logical interface is selected, dynamically select a local endpoint address for the IPsec VPN tunnel based on whether the selected internal interface is the one of the at least one physical interfaces, the one of the at least one logical interfaces, and whether another IPSec VPN tunnel is already utilizing the selected internal interface, and establish the IPsec VPN tunnel through the selected internal interface of the wireless mesh network access node using the selected local endpoint address.

As previously described, for an embodiment, the access node further comprises an internal map that maps the selected internal interface with the type of traffic.

As previously described, for an embodiment, the at least one logical interface is not tied to a physical port, and created to send and receive IP traffic. An embodiment further includes encapsulating non-IP packets of non-IP traffic within IP packets. For an embodiment, determining at least one logical interface for non-IP traffic includes creating the at least one logical interface with an IP address for encapsulating non-IP packets into IP packets and communicating the IP address to a remote VPN device. An embodiment further includes de-advertising a route for the IP address in the wireless mesh network if the IP address was previously advertised, thereby preventing the IP address from being accessed directly without going through the IPsec VPN tunnel.

As previously described, for an embodiment, the access node dynamically determining a local endpoint address for the IPsec VPN tunnel includes determining the local endpoint address to be an address of the selected physical interface if the selected internal interface includes the one of the at least one physical interface physical interface, and a prior IPsec VPN tunnel is not using the selected physical interface.

As previously described, for an embodiment, the access node dynamically determining a local endpoint address for the IPsec VPN tunnel includes creating a new logical interface, and determining the local endpoint address to be an address of the new logical interface if the selected internal interface includes the one of the at least one physical interface, and a prior IPsec VPN tunnel is using the selected physical interface.

As previously described, for an embodiment, the access node dynamically determining a local endpoint address for the IPsec VPN tunnel includes determining the local endpoint address to be an address of the selected physical interface if the selected internal interface includes the one of the at least one physical interface on a same VLAN (Virtual Local Area Network) as specified by the user configuration.

As previously described, for an embodiment, the access node dynamically determining a local endpoint address for the IPsec VPN tunnel includes creating a new logical interface and determining the local endpoint address to be an address of the new logical interface if the selected internal interface includes the one of the at least one physical interface and an available physical interface is not on a same VLAN (Virtual Local Area Network) as specified by the user configuration.

As previously described, for an embodiment, the access node dynamically determining a local endpoint address for the IPsec VPN tunnel includes determining the local endpoint address to be an address of an available physical interface if the selected internal interface includes the one of the at least one logical interface that was selected for non-IP traffic.

As previously described, for an embodiment, the access node dynamically determining a local endpoint address for the IPsec VPN tunnel includes determining the local endpoint address to be an address of an available physical interface if the selected internal interface includes the one of the at least one logical interface that was selected for non-IP traffic., and the selected physical interface is on a same VLAN (Virtual Local Area Network) as specified by the user configuration.

As previously described, for an embodiment, the access node dynamically determining a local endpoint address for the IPsec VPN tunnel includes creating a new logical interface and determining the local endpoint address to be an address of the new logical interface if the selected internal interface includes the one of the at least one logical interface that was selected for non-IP traffic and no physical interface is available.

As previously described, for an embodiment, the access node dynamically determining a local endpoint address for the IPsec VPN tunnel includes creating a new logical interface and determining the local endpoint address to be an address of the new logical interface if the selected internal interface includes the one of the at least one logical interface that was selected for non-IP traffic and an available physical interface is not on a same VLAN (Virtual Local Area Network) as specified by the user configuration.

As previously described, an embodiment further includes the access node communicating the selected internal interface to a remote device if the selected internal interface includes a logical interface, and statically configuring an IP (internet protocol) using the logical interface.

As previously described, an embodiment further includes the access node advertising to the wireless mesh network, the selected local endpoint address if the selected local endpoint address was selected based on creation of a new logical interface, thereby allowing establishment of the IPsec VPN tunnel.

Additional Embodiments

As described, at least some embodiments include establishment of the IPsec VPN tunnel. An embodiment includes IPsec Auto Tunnel Establishment Using Ping Packets. Existing methods for setting up an IP VPN tunnel between a client device and a remote network require activity by the client device in order for the tunnel to be established. If there is no activity by the client, no tunnel is established. However, at least some of the embodiments described here do not require the client device to be active. The described embodiments include the establishment of an IP VPN tunnel based on a router receiving a client configuration.

An embodiment includes a method of establishing an IPsec (Internet Protocol Security) VPN (Virtual Private Network) tunnel. The method includes receiving, by a router (such as the previously describe wireless access node), a client configuration (the client can be active or not. The method further includes selecting, by the router, an IP address, wherein the selected IP address is within a range provided by the client configuration, assigning, by the router, the selected IP address to a temporary logical interface. The method further includes, sending, by the router, a ping packet from the temporary logical interface to a remote network (as defined by the client configuration) to open an IPsec VPN tunnel between the router and the remote network, and removing, by the router, the temporary logical interface once the IPsec VPN tunnel is open. At least some embodiments further include re-sending, by the router, another ping packet from the temporary logical interface to the remote network if an error is received from the remote network.

An embodiment includes a router (such as the previously described wireless access node) wherein the router includes one or more processors operative to receive a client configuration; (the client can be active or not), select an IP address, wherein the selected IP address is within a range provided by the client configuration, assign the selected IP address to a virtual interface, send a ping packet from the virtual interface to a remote network (as defined by the client configuration) to open an IPsec (Internet Protocol Security) VPN (Virtual Private Network) tunnel between the router and the remote network, and remove the virtual interface once the IPsec VPN tunnel is open. An embodiment of the router further includes the one or more processors operative to re-send another ping packet from the virtual interface to the remote network if an error is received from the remote network.

Although specific embodiments have been described and illustrated, the embodiments are not to be limited to the specific forms or arrangements of parts so described and illustrated.

What is claimed:

1. A method of establishing an IPsec (Internet Protocol Security) VPN (Virtual Private Network) tunnel, comprising:
   receiving, by an access node of a wireless mesh network, a user configuration, wherein the user configuration includes a type of traffic;
   determining an internal interface of the access node based on the type of traffic from at least one physical interface or at least one logical interface, wherein if the type of traffic includes IP traffic, then one of the at least one physical interface is selected, and if the type of traffic includes non-IP traffic, then one of the at least one logical interface is selected, wherein determining at least one logical interface for non-IP traffic includes creating the at least one logical interface with an IP address for encapsulating non-IP packets into IP packets, and communicating the IP address to a remote VPN device;
   dynamically determining a local endpoint address for the IPsec VPN tunnel based on whether the selected internal interface is the one of the at least one physical interfaces, the one of the at least one logical interfaces, and whether another IPSec VPN tunnel is already utilizing the selected internal interface;
   establishing the IPsec VPN tunnel through the selected internal interface of the wireless mesh network access node using the selected local endpoint address; and
   de-advertising a route for the IP address in the wireless mesh network if the IP address was previously advertised, thereby preventing the IP address from being accessed directly without going through the IPsec VPN tunnel.

2. The method of claim 1, wherein the access node further comprises an internal map that maps the selected internal interface with the type of traffic.

3. The method of claim 1, wherein the at least one logical interface is not tied to a physical port, and created to send and receive IP traffic.

4. The method of claim 1, further comprising encapsulating non-IP packets of non-IP traffic within IP packets.

5. The method of claim 1, further comprising advertising an IP address of a new logical interface to any upstream access nodes and the upstream gateway of the wireless mesh network if the local endpoint address was determined based on the new logical interface, thereby allowing the any upstream access nodes and the upstream gateway to establish a route to the access node based on the IP address.

6. The method of claim 1, wherein dynamically determining a local endpoint address for the IPsec VPN tunnel comprises:
   determining the local endpoint address to be an address of the selected physical interface if the selected internal interface includes the one of the at least one physical interface physical interface, and a prior IPsec VPN tunnel is not using the selected physical interface.

7. The method of claim 1, wherein dynamically determining a local endpoint address for the IPsec VPN tunnel comprises:
   creating a new logical interface, and determining the local endpoint address to be an address of the new logical interface if the selected internal interface includes the one of the at least one physical interface, and a prior IPsec VPN tunnel is using the selected physical interface.

8. The method of claim 1, wherein dynamically determining a local endpoint address for the IPsec VPN tunnel comprises:
   determining the local endpoint address to be an address of the selected physical interface if the selected internal interface includes the one of the at least one physical interface on a same VLAN (Virtual Local Area Network) as specified by the user configuration.

9. The method of claim 1, wherein dynamically determining a local endpoint address for the IPsec VPN tunnel comprises:
   creating a new logical interface and determining the local endpoint address to be an address of the new logical interface if the selected internal interface includes the one of the at least one physical interface and an available physical interface is not on a same VLAN (Virtual Local Area Network) as specified by the user configuration.

10. The method of claim 1, wherein dynamically determining a local endpoint address for the IPsec VPN tunnel comprises:
    determining the local endpoint address to be an address of an available physical interface if the selected internal interface includes the one of the at least one logical interface that was selected for non-IP traffic.

11. The method of claim 1, wherein dynamically determining a local endpoint address for the IPsec VPN tunnel comprises:
    determining the local endpoint address to be an address of an available physical interface if the selected internal interface includes the one of the at least one logical interface that was selected for non-IP traffic, and the selected physical interface is on a same VLAN (Virtual Local Area Network) as specified by the user configuration.

12. The method of claim 1, wherein dynamically determining a local endpoint address for the IPsec VPN tunnel comprises:
  creating a new logical interface and determining the local endpoint address to be an address of the new logical interface if the selected internal interface includes the one of the at least one logical interface that was selected for non-IP traffic and no physical interface is available.

13. The method of claim 1, wherein dynamically determining a local endpoint address for the IPsec VPN tunnel comprises:
  creating a new logical interface and determining the local endpoint address to be an address of the new logical interface if the selected internal interface includes the one of the at least one logical interface that was selected for non-IP traffic and an available physical interface is not on a same VLAN (Virtual Local Area Network) as specified by the user configuration.

14. The method of claim 1, further comprising communicating the selected internal interface to a remote device if the selected internal interface includes a logical interface, and statically configuring an IP (internet protocol) using the logical interface.

15. The method of claim 1, further comprising advertising to the wireless mesh network, the selected local endpoint address if the selected local endpoint address was selected based on creation of a new logical interface, thereby allowing establishment of the IPsec VPN tunnel.

16. A wireless mesh network access node, comprising:
  one or more transceivers for communicating with an upstream access node or an upstream gateway of a wireless mesh network, and a client device;
  a controller, the controller operative to:
    receive a user configuration, wherein the user configuration includes a type of traffic;
    select an internal interface of the access node based on the type of traffic from at least one physical interface or at least one logical interface, wherein if the type of traffic includes IP traffic, then one of the at least one physical interface is selected, and if the type of traffic includes non-IP traffic, then one of the at least one logical interface is selected, wherein selecting at least one logical interface for non-IP traffic includes creating the at least one logical interface with an IP address for encapsulating non-IP packets into IP packets, and communicating the IP address to a remote VPN device;
    dynamically select a local endpoint address for the IPsec VPN tunnel based on whether the selected internal interface is the one of the at least one physical interfaces, the one of the at least one logical interfaces, and whether another IPSec VPN tunnel is already utilizing the selected internal interface;
    establish the IPsec VPN tunnel through the selected internal interface of the wireless mesh network access node using the selected local endpoint address; and
    de-advertise a route for the IP address in the wireless mesh network if the IP address was previously advertised, thereby preventing the IP address from being accessed directly without going through the IPsec VPN tunnel.

17. The wireless mesh network access node of claim 16, wherein the controller is further operative to:
  advertise an IP address of a new logical interface to any upstream access nodes and the upstream gateway of the wireless mesh network if the local endpoint address was determined based on the new logical interface, thereby allowing the any upstream access nodes and the upstream gateway to establish a route to the access node based on the IP address.

18. The wireless mesh network access node of claim 16, wherein dynamically determining a local endpoint address for the IPsec VPN tunnel includes the controller operative to:
  select the local endpoint address to be an address of the selected physical interface if the selected internal interface includes the one of the at least one physical interface physical interface, and a prior IPsec VPN tunnel is not using the selected physical interface.

19. The wireless mesh network access node of claim 16, wherein dynamically determining a local endpoint address for the IPsec VPN tunnel includes the controller operative to:
  select the local endpoint address to be an address of an available physical interface if the selected internal interface includes the one of the at least one logical interface that was selected for non-IP traffic.

20. The wireless mesh network access node of claim 16, wherein dynamically determining a local endpoint address for the IPsec VPN tunnel includes the controller operative to:
  create a new logical interface and determining the local endpoint address to be an address of the new logical interface if the selected internal interface includes the one of the at least one logical interface that was selected for non-IP traffic and no physical interface is available.

21. A system for establishing an IPsec (Internet Protocol Security) VPN (Virtual Private Network) tunnel, comprising:
  a gateway;
  a wireless mesh network access point wirelessly connected to the gateway, wherein the wireless mesh network access point is operative to:
    receive a user configuration, wherein the user configuration includes a type of traffic;
    determine an internal interface of the wireless mesh network access node based on the type of traffic from at least one physical interface or at least one logical interface, wherein if the type of traffic includes IP traffic, then one of the at least one physical interface is selected, and if the type of traffic includes non-IP traffic, then one of the at least one logical interface is selected, wherein determining at least one logical interface for non-IP traffic includes creating the at least one logical interface with an IP address for encapsulating non-IP packets into IP packets, and communicating the IP address to a remote VPN device;
    dynamically determine a local endpoint address for the IPsec VPN tunnel based on whether the selected internal interface is the one of the at least one physical interfaces, the one of the at least one logical interfaces, and whether another IPSec VPN tunnel is already utilizing the selected internal interface;
    establish the IPsec VPN tunnel through the selected internal interface of the wireless mesh network access node using the selected local endpoint address, and
    de-advertise a route for the IP address in the wireless mesh network if the IP address was previously advertised, thereby preventing the IP address from being accessed directly without going through the IPsec VPN tunnel.

* * * * *